United States Patent Office 3,153,039
Patented Oct. 13, 1964

3,153,039
BICYCLIC AMINOKETONES AND METHOD FOR
THE PRODUCTION THEREOF
Hans E. Krieger, Hallituskatu 26, Oulu, Finland
No Drawing. Filed Nov. 19, 1962, Ser. No. 238,748
Claims priority, application Finland, Nov. 23, 1961,
2,055/61
5 Claims. (Cl. 260—247.7)

This invention relates to bicyclic aminoketones and a method of preparing bicyclic aminoketones represented by the following general formula:

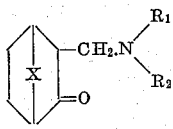

I wherein $R_1$ and $R_2$ represent alkyl, cycloalkyl, aryl, aralkyl or together with N form an heterocyclic ring, which possibly contains another heteratom, e.g., the pyrrolidine ring, the piperidine ring, the morpholine ring or the piperazine ring which may contain substituents selected from alkyl esters of low molecular weight, and X represents the —$CH_2$— group or the —$CH_2.CH_2$— group.

It is old in the art to react cycloaliphatic ketones with formaldehyde and secondary amines to give aminoketones which include compounds of useful pharmacological activity (cf. Swiss Patent No. 347,829). It has now been found that compounds having useful pharmacological properties may be prepared by employing bicyclo-[2.2.1]-heptanone-(2) and bicyclo-[2.2.2]-octanone as starting materials and by reacting the said with formaldehyde and secondary amines.

The novel aminoketones of this invention are prepared by refluxing bicyclo-[2.2.1]-heptanone-(2) or bicyclo-[2.2.2]-octanone with secondary amines or salts thereof and formaldehyde, advantageously in aqueous solution and in the presence of an acid. Unreacted starting ketone may be recovered from the reaction mixture by dissolving the same in an organic solvent or by steam distillation. The resulting aminoketones may be isolated directly from the reaction mixtures as hydrochlorides or after making the reaction mixtures basic as free aminoketones. The novel aminoketones of this invention are stable compounds and can be subjected to high vacuum distillation without decomposing. In water the free aminoketones are sparingly soluble, if at all but their salts, e.g., the hydrochloride and the methobromide are readily soluble in water.

The novel aminoketones of the invention have relatively low toxicity (e.g. $DL_{50}$, s.c. of Albino-Swiss-Webster mice is about 800 mg./kg., for 3-dimethylaminoethyl-and 3-piperidino-methyl-bicyclo-[2.2.1]) and in animal tests the same show an analgetic activity corresponding to that of acetyl-salicylic acid.

It is to be understood that the obtained aminoketones may be used as intermediates in the preparation of other compounds and as admixtures in other suitable pharmaceuticals.

Bicyclo-[2.2.1]-heptanone-derivatives are known to have the endo-exo-isomerism form shown below:

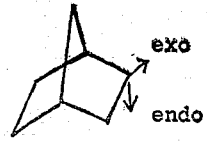

It was ascertained that the group —$CH_2NR_1R_2$ occurring in the general formula is in the exo-position because, e.g., in the case of 3-dimethylaminomethyl-bicyclo-[2.2.1]-heptanone-(2) the removal of the carbonyl-group according to the method of Huang-Minlon yielded exo-3-dimethylaminoethyl-bicyclo-[2.2.1]-heptane the configuration of which has been proved.

EXAMPLE 1

110 g. of bicyclo-[2.2.1]-heptanone-(2) (1 mole) was heated under reflux for 20 hours with 123.5 g. of morpholine-hydrochloride (1 mole) and 120 ml. of 40% formaldehyde solution (1.6 moles) to which had been added 1 ml. of concentrated hydrochloric acid. After cooling, unreacted bicyclo-[2.2.1]-heptanone-(2) was removed by extraction with ether (or directly with steam distillation), the aqueous solution was made alkaline with solid potassium carbonate and again extracted with ether. The ether solution was dried and the ether removed by distillation. The residue was distilled under high vacuum and 3-morpholine-methyl-bicyclo-[2.2.1]-heptanone-(2) was collected at 102–106°/0.04 torr. The yield was 72% as calculated or reacted bicyclo-[2.2.1]-heptanone-(2). The aqueous solution as such may also be evaporated in vacuo and the obtained hydrochloride can be purified by recrystallization from n-propanol. The recrystallized salt melted at 194.0–194.5° C.

Of some of the new aminoketones of this invention which can be derived from bicyclo-[2.2.1]-heptanone-(2), the physical data of the free aminoketones as well as the melting points and halogen analysis values of their hydrochlorides and methobromides are given in the following tables. The procedure described in Example 1 was used for preparing the compounds with the exception of the dimethylaminomethyl compound which was prepared according to Example 2.

Table I

| $-N\begin{matrix}R_1\\R_2\end{matrix}$ | Formula | Mol. w. | Boiling at °C./Torr. | $n_D^{20}$ | $d_4^{20}$ | $M_D$ obtained | $M_D$ calc. | Yield as calculated from reacted ketone |
|---|---|---|---|---|---|---|---|---|
| $-N\begin{matrix}CH_3\\CH_3\end{matrix}$ | $C_{10}H_{17}NO$ | 167.24 | 58–61/0.02 | 1.4820 | 0.9939 | 47.97 | 47.94 | 48 |
| $-N\begin{matrix}C_2H_5\\C_2H_5\end{matrix}$ | $C_{12}H_{21}NO$ | 195.30 | 85–88/0.1 | 1.4770 | 0.9648 | 57.20 | 57.17 | 57 |
| $-N\begin{matrix}C_3H_7\\C_3H_7\end{matrix}$ | $C_{14}H_{25}NO$ | 223.35 | ¹ 97–100/0.2 | 1.4698 | 0.9364 | 66.42 | 66.40 | 23 |

Table I—Continued

| $-N\begin{smallmatrix}R^1\\R^2\end{smallmatrix}$ | Formula | Mol. w. | Boiling at °C./Torr. | $n_D^{2[}$ | $d^{42}[$ | MS obtained | MS calc. | Yield as calculated from reacted ketone |
|---|---|---|---|---|---|---|---|---|
| $-N(CH_3)(C_6H_{11})$ (N-methyl-cyclohexyl) | $C_{15}H_{25}NO$ | 235.36 | 128–132/0.9 | 1.5025 | 1.0046 | 69.07 | 68.82 | 55 |
| $-N(CH_3)(CH_2C_6H_5)$ (N-methyl-benzyl) | $C_{16}H_{21}NO$ | 243.34 | 132–136/0.03 | 1.5338 | 1.0490 | 72.08 | 72.04 | 62 |
| pyrrolidinyl | $C_{12}H_{19}NO$ | 193.28 | 102–104/0.08 | 1.5015 | 1.0317 | 55.24 | 54.97 | 60 |
| piperidinyl | $C_{13}H_{21}NO$ | 207.31 | 102–106/0.04 | 1.5042 | 1.0229 | 60.03 | 59.59 | 70 |
| morpholinyl | $C_{12}H_{19}NO_2$ | 209.28 | 122–124/0.15 | 1.5055 | 1.0938 | 56.79 | 56.61 | 72 |
| 4-methylpiperazinyl | $C_{13}H_{22}N_2O$ | 222.32 | 118–122/0.15 | 1.5069 | 1.0364 | 63.82 | 63.52 | 60 |

[1] Melting at 38.0–38.5.

Table II

| $-N\begin{smallmatrix}R_1\\R_2\end{smallmatrix}$ | Hydrochloride melting at °C. | Chrystallized from a solution of— | Percent Cl calc. | Percent Cl obtained | Methbromide melting at °C. | Chrystallized from a solution of— | Percent Br calc. | Percent Br obtained |
|---|---|---|---|---|---|---|---|---|
| $-N(CH_3)_2$ | 194.5–195.0 | Ether/ethanol | 17.40 | 17.40 | 249.0–249.5 | Ethanol | 30.48 | 30.31 |
| $-N(C_2H_5)_2$ | 143.0–144.0 | Acetone | 15.29 | 15.51 | Hygroscopic | — | — | — |
| $-N(C_3H_7)_2$ | 150.5–151.5 | Ether/isopropanol | 13.64 | 13.57 | — | — | — | — |
| $-N(CH_3)(C_6H_{11})$ | 137.5–139.0 | Ether/acetone | 13.04 | 13.69 | 194.0–195.5 | Isopropanol/di-isoprophy-ether. | 24.19 | 24.46 |
| $-N(CH_3)(CH_2C_6H_5)$ | 177.5–178.5 | Ether/ethanol | 12.67 | 13.20 | 180.5–109.5 | Ethylacetate/ethanol. | 23.62 | 23.51 |
| pyrrolidinyl | 191.5–192.0 | do | 15.43 | 15.48 | 213.0–213.5 | n-Propanol | 27.72 | 28.02 |
| piperidinyl | 201.5–202 | do | 14.54 | 14.51 | 255.5–256.0 | do | 26.43 | 26.66 |
| morpholinyl | 194.0–194.5 | do | 14.42 | 14.63 | 225.5–226.0 | do | 26.26 | 26.24 |
| 4-methylpiperazinyl | 202.0–202.5 | Acetone/ethanol | [1] 24.01 | 23.28 | 259.5–260.5 | Isopropanol/methanol. | 25.19 | 25.60 |

[1] Dihydrochloride.

EXAMPLE 2

110 g. of bicyclo-[2.2.1]-heptanone-(2) (1 mole), 135 ml. of 33% dimethylamino (1 mole), 120 ml. of 40% formalin solution (1.6 mole) and 100 ml. of concentrated hydrochloric acid were heated under reflux for 20 hours. The mixture was worked up as in Example 1 to give dimethylaminomethyl-bicyclo-[2.2.1]-heptanone-(2) boiling at 58–61°/0.02 torr. Yield: 48% as calculated on the reacted bicyclo-[2.2.1]-heptanone-(2).

Paraformaldehyde may also be employed in place of formaldehyde.

The preparation of salts is effected in known manner.

The reactions with bicyclo-[2.2.2]-octanone follow the procedures described in Example 1 and Example 2. E.g., 3 - piperidino - bicyclo - [2.2.2] - octanone boils at 115–120°/0.03 torr., $n_D^{20}$ 1.5050, $D_4^{20}$ 1.0159, $M_D$ calc. 64.20), its methoiodid (from ethanol/ether (2:1) melts at 206.5–208°, formula $C_{15}H_{26}NOJ$ (363.28), calc. C 49.59, H 7.21, and N 3.85, obtained C 49.35, H 7.36, N 3.97.

I claim:
1. A member of the group consisting of
    (1) a compound having the formula

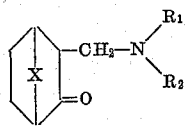

wherein X is a member of the group consisting of methylene and ethylene; $R_1$ and $R_2$ designate a member of the group consisting of alkyl having from 1 to 4 carbon atoms, cyclohexyl, phenyl and benzyl, and wherein the —$NR_1R_2$ is a member of the group consisting of morpholino, piperazino, and a cyclic radical containing from 4 to 6 carbon atoms whereof the cyclic radical contains, as nuclear substitutents, from 1 to 2 methyl radicals; and
    (2) the hydrohalides, iodomethylate and methosulfate of a compound as defined in (1).
2. 3-piperiodinomethyl-bicyclo [2.2.1] heptanone-(2).
3. 3-pyrrolidinomethyl-bicyclo [2.2.1] heptanone-(2).
4. 3-morpholinomethyl-bicyclo [2.2.1] heptanone-(2).
5. 3-(N-methyl-N-benzyl/methyl-bicyclo [2.2.1] heptanone-(2).

References Cited in the file of this patent
UNITED STATES PATENTS

| | | |
|---|---|---|
| 2,779,762 | Robertson et al. | Jan. 29, 1957 |
| 2,861,993 | Schlichting et al. | Nov. 25, 1958 |